(12) United States Patent  
Shen

(10) Patent No.: US 11,185,846 B2  
(45) Date of Patent: Nov. 30, 2021

(54) AMBIENT HUMIDITY CONTROL ARTICLE

(71) Applicant: SHANGHAI HENGYUAN MACROMOLECULAR MATERIALS CO., LTD., Shanghai (CN)

(72) Inventor: Sandra Shen, Shanghai (CN)

(73) Assignee: SHANGHAI HENGYUAN MACROMOLECULAR MATERIALS CO., LTD, Shanghai (CN)

( * ) Notice: Subject to any disclaimer, the term of this patent is extended or adjusted under 35 U.S.C. 154(b) by 621 days.

(21) Appl. No.: 16/084,973

(22) PCT Filed: Jul. 20, 2018

(86) PCT No.: PCT/CN2018/096459  
§ 371 (c)(1),  
(2) Date: Sep. 14, 2018

(87) PCT Pub. No.: WO2020/000540  
PCT Pub. Date: Jan. 2, 2020

(65) Prior Publication Data  
US 2020/0298205 A1 Sep. 24, 2020

(30) Foreign Application Priority Data  
Jun. 29, 2018 (CN) .......................... 201810700463.7

(51) Int. Cl.  
*B01D 53/02* (2006.01)  
*B01J 20/28* (2006.01)  
(Continued)

(52) U.S. Cl.  
CPC ......... *B01J 20/2805* (2013.01); *A23L 3/3427* (2013.01); *B01D 53/261* (2013.01);  
(Continued)

(58) Field of Classification Search  
CPC ............ A23L 3/3427; B01D 2253/112; B01D 2253/25; B01D 2259/4525;  
(Continued)

(56) References Cited

U.S. PATENT DOCUMENTS 4,769,053 A * 9/1988 Fischer, Jr. ........... F28D 19/042  
96/125  
5,686,161 A * 11/1997 Cullen ..................... B32B 5/16  
428/68  
(Continued)

*Primary Examiner* — Christopher P Jones  
(74) *Attorney, Agent, or Firm* — Im IP Law; Chai Im; C. Andrew Im

(57) ABSTRACT

An ambient humidity control article for controlling the ambient humidity within 65%-75%. The article includes a substrate which has a predetermined water absorbability, and a humidity control layer coated on the substrate. The humidity control layer is made up of a humidity control composition. The amount of the composition coated on per cubic centimeter of the substrate is 0.54-0.74 grams. The composition includes at least one chloride salt and water. The chloride salt includes at least one of NaCl, $NH_4Cl$, KCl and $MgCl_2$. The weight percentage of the chloride salt is 18%-44.6%. The water absorption amount of the substrate is not less than 0.5 grams per cubic centimeter. The article can control the ambient humidity without the need to pre-adjust the objective space. The article has a large capacity of moisture absorption and desorption and can quickly achieve the desired humidity in the objective environment.

8 Claims, 2 Drawing Sheets

(51) Int. Cl.
*A23L 3/3427* (2006.01)
*B01D 53/26* (2006.01)
*B01D 53/28* (2006.01)
*B01J 20/04* (2006.01)
*B65D 81/18* (2006.01)
*B65D 81/26* (2006.01)

(52) U.S. Cl.
CPC ............ *B01D 53/28* (2013.01); *B01J 20/046* (2013.01); *B65D 81/18* (2013.01); *B65D 81/267* (2013.01); *A23V 2002/00* (2013.01); *B01D 2253/112* (2013.01); *B01D 2253/25* (2013.01)

(58) Field of Classification Search
CPC .. B01D 53/0407; B01D 53/261; B01D 53/28; B01J 20/046; B01J 20/2805; B65D 81/18; B65D 81/26; B65D 81/267
See application file for complete search history.

(56) References Cited

U.S. PATENT DOCUMENTS

| | | | | |
|---|---|---|---|---|
| 5,709,736 | A  * | 1/1998 | Fujimura | B01D 53/06 96/144 |
| 7,288,201 | B2 * | 10/2007 | King | B01D 53/261 210/679 |
| 7,790,638 | B2 * | 9/2010 | Herrlich-Loos | D06M 13/17 442/59 |
| 7,824,766 | B2 * | 11/2010 | Eplee | D21H 13/16 428/323 |
| 2004/0224144 | A1* | 11/2004 | Saari | G05D 22/00 428/316.6 |
| 2006/0039841 | A1* | 2/2006 | Rico | A61L 2/208 422/305 |
| 2007/0012186 | A1* | 1/2007 | Wilson | B01D 46/10 95/117 |
| 2007/0160789 | A1* | 7/2007 | Merical | B32B 27/308 428/35.7 |
| 2009/0022434 | A1* | 1/2009 | Chiba | B32B 15/20 383/109 |
| 2016/0058060 | A1* | 3/2016 | Ramm-Schmidt | A23B 4/023 424/682 |

\* cited by examiner

AMBIENT HUMIDITY CONTROL ARTICLE

RELATED APPLICATIONS

This application is a § 371 application from PCT/CN2018/096459 filed Jul. 20, 2018, which claims priority from Chinese Patent Application No. 201810700463.7 filed Jun. 29, 2018, each of which is herein incorporated by reference in its entirety.

FIELD OF THE INVENTION

The present invention relates specifically to an ambient humidity control article.

BACKGROUND OF THE INVENTION

"Humidity" is an important factor that affects product packaging and storage life in all walks of life. Each product requires a reasonable humidity range to store. For example, the humidity to store cigar products is about 69%, the ambient humidity below the numerical value will make the internal moisture of the cigar products too low and then accelerate the ageing of the cigar products, and the ambient humidity above the numerical value will cause the cigar products rot and then damage the taste of the cigar products. The humidity to store some seeds is about 65%-75%, the ambient humidity below the numerical value will cause the seeds to dry out and be moth-eaten, and the ambient humidity above the numerical value will cause the seeds to become moldy and then lose their vitality. The humidity to store frozen meat food is within 65%-75%, the ambient humidity below the numerical value will cause the frozen meat food to dry up, and the ambient humidity above the numerical value will make food sticky and slip, promote bacterial growth and accelerate food spoilage.

In order to control the ambient humidity within 65%-75%, the common method is to use humidity control silica gel to control the ambient humidity. However, the use of humidity control silica gel is not in line with green products. During the manufacture of humidity control silica gel, a lot of wastewater will be produced. In order to protect the environment, many silicone raw material factories are closed for rectification. This has led various industries to start to comprise desiccant product, which is the least important in the original list of materials table, in the procurement list of important materials.

Therefore, there is an urgent need for an alternative to humidity control silica gel, and the alternative must be in line with the green and environment theme.

SUMMARY OF THE INVENTION

The present invention is made for solving the foregoing problems and aims to provide an ambient humidity control article.

The present invention provides an ambient humidity control article for use in controlling ambient humidity within 65%-75%, comprising: the substrate, which has a certain water absorbability; the humidity control layer, which is coated on the substrate and made up of humidity control composition. Wherein the amount of the humidity control composition coated on per cubic centimeter of the substrate is 0.54-0.74 grams. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%, the water absorption amount of the substrate is not less than 0.5 grams per cubic centimeter.

Further, the ambient humidity control article can also have the following features: wherein the humidity control composition comprises one of the chloride salt, the chloride salt is NaCl, the weight percentage of the chloride salt in the humidity control composition is 18%-40.2%.

Further, the ambient humidity control article can also have the following features: wherein the humidity control composition comprises two kinds of the chloride salt, one of the chloride salt is any one of the KCl and $NH_4Cl$ and the other one of the chloride salt is NaCl, the weight percentage of the NaCl in the humidity control composition is 10.5%-24%, the weight percentage of the $NH_4Cl$ in the humidity control composition is 7.5%-20.6%, the weight percentage of the KCl in the humidity control composition is 3%-15.75%.

Further, the ambient humidity control article can also have the following features: wherein the weight percentage of the NaCl in the humidity control composition is 16.5%-22.5%, the weight percentage of the $NH_4Cl$ in the humidity control composition is 12%-18%, the weight percentage of the KCl in the humidity control composition is 4.5%-12%.

Further, the ambient humidity control article can also have the following features: wherein the weight percentage of the NaCl in the humidity control composition is 21%-22.6%, the weight percentage of the $NH_4Cl$ in the humidity control composition is 15%-17.1%, the weight percentage of the KCl in the humidity control composition is 7.5%-11.1%.

Further, the ambient humidity control article can also have the following features: wherein the humidity control composition comprises two kinds of the chloride salt, one of the chloride salt is KCl and the other one of the chloride salt is $MgCl_2$, the weight percentage of the $MgCl_2$ in the humidity control composition is 9%-25.5%, the weight percentage of the KCl in the humidity control composition is 4.5%-22.5%, the total weight percentage of the chloride salt in the humidity control composition is 18%-44.6%.

Further, the ambient humidity control article can also have the following features: wherein the material of the substrate is any one of paper type material, cotton, chemical fiber material, non-woven fabric, felt, porous plastics and mineral-based material.

Further, the ambient humidity control article can also have the following features: package bag, wherein the package bag is used to hold the substrate coated with the humidity control composition.

Further, the ambient humidity control article can also have the following features: wherein the material of the package bag is any one of non-woven fabric, composite plastic, paper-plastic composite and cloth.

The Effect of the Present Invention

The ambient humidity control article according to the present invention comprises: substrate, which have a certain water absorbability; humidity control layer, which is coated on the substrate. Wherein the amount of the humidity control composition coated on per cubic centimeter of the substrate is 0.54-0.74 grams. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%, the water absorption amount of the substrate is not less than 0.5 grams per cubic centimeter. Therefore, the ambient humidity control article of the present invention can control the ambient humidity within 65%-75%, does not need to pre-adjust the objective space, has large capacity of moisture absorption and desorption and can quickly achieve the desired humidity in the objective environment.

Moreover, since the ambient humidity control article of the present invention comprises only chloride salt in common, the composition manufactured by using the chloride salt is not only cheap, but also safe for human body when manufacturing, environment and the objects to be preserved. In addition, the ambient humidity control article of the present invention is still friendly to the natural environment after being discarded and can be decomposed naturally without causing secondary pollution.

DETAILED DESCRIPTION OF THE PREFERRED EMBODIMENTS

Embodiment 1

Figure 1:
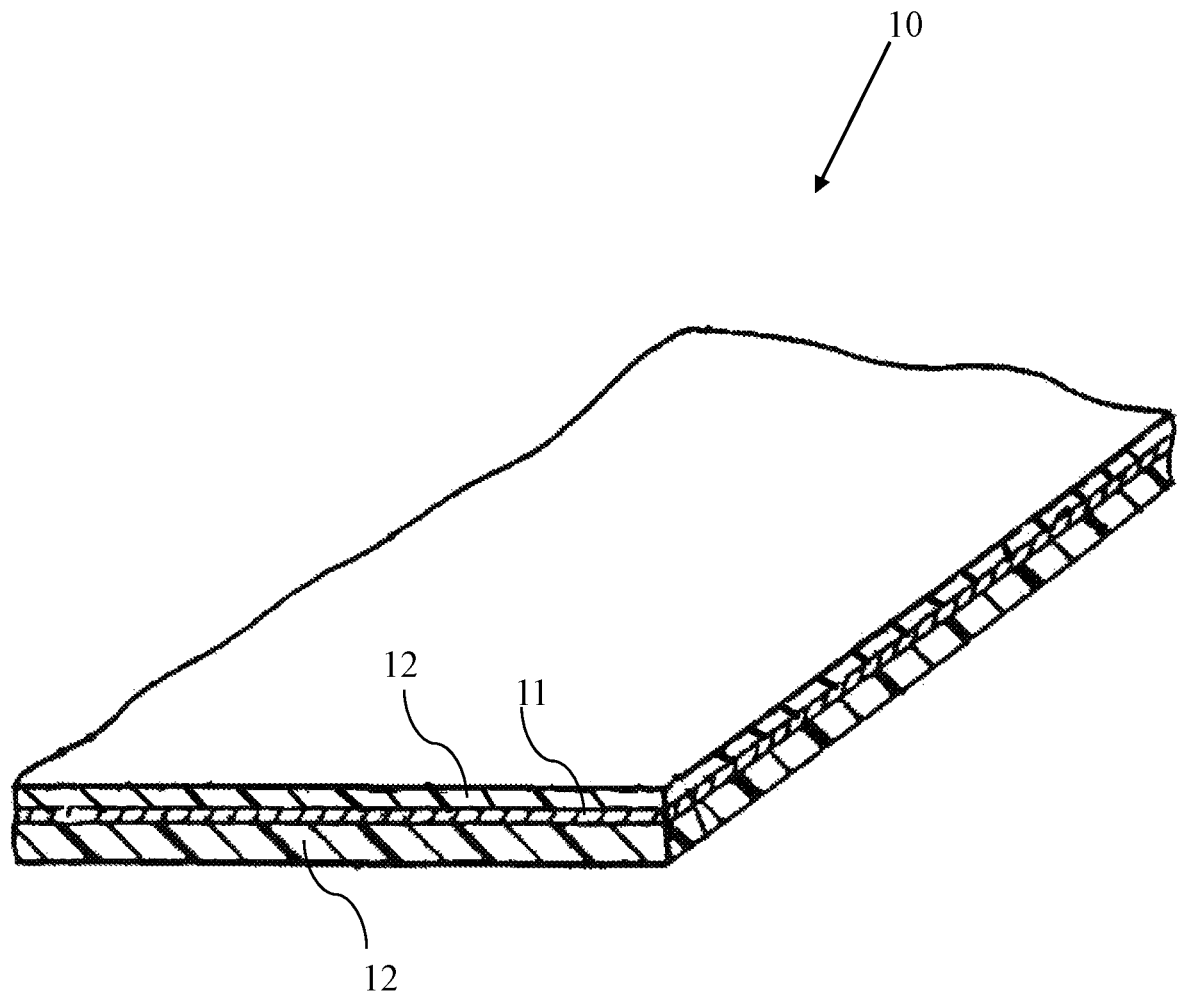
FIG. 1 is a schematic diagram of structure showing the ambient humidity control article in embodiment 1.

FIG. 1 is a schematic diagram of structure showing the ambient humidity control article in embodiment 1.

With respect to FIG. 1, the ambient humidity control article 10 in embodiment 1 is used to control ambient humidity within 65%-75%. The ambient humidity control article 10 comprises substrate 11 and humidity control layer 12 coated on the substrate 11.

Substrate 11 has a certain water absorbability, the water absorption amount of the substrate is not less than 0.5 grams per cubic centimeter. The material of the substrate is any one of paper type material, cotton, chemical fiber material, non-woven fabric, felt, porous plastics and mineral-based material. In the embodiment 1, cotton-wood pulp paper in paper type material is selected as the substrate. The water absorption amount of the cotton-wood pulp paper is at least 0.8 grams per cubic centimeter, the water-retaining property amount of the cotton-wood pulp paper is at least 1.2 grams per cubic centimeter. For easy tailoring, the thickness of the cotton-wood pulp paper is 0.2 mm-3 mm.

The size of the substrate can be tailored to the needs of customers and the size is 1 cm×1 cm-60 cm×60 cm.

Humidity control layer 12 is made up of humidity control composition. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%. In the embodiment 1, the humidity control composition comprises NaCl and water, the weight percentage of the NaCl in the humidity control composition is 18%-40.2%.

The purity of the NaCl is not less than 99.9%. The water is deionized water.

The amount of the humidity control composition coated on per cubic centimeter of the substrate is 0.64 grams.

Embodiment 2

Figure 2:
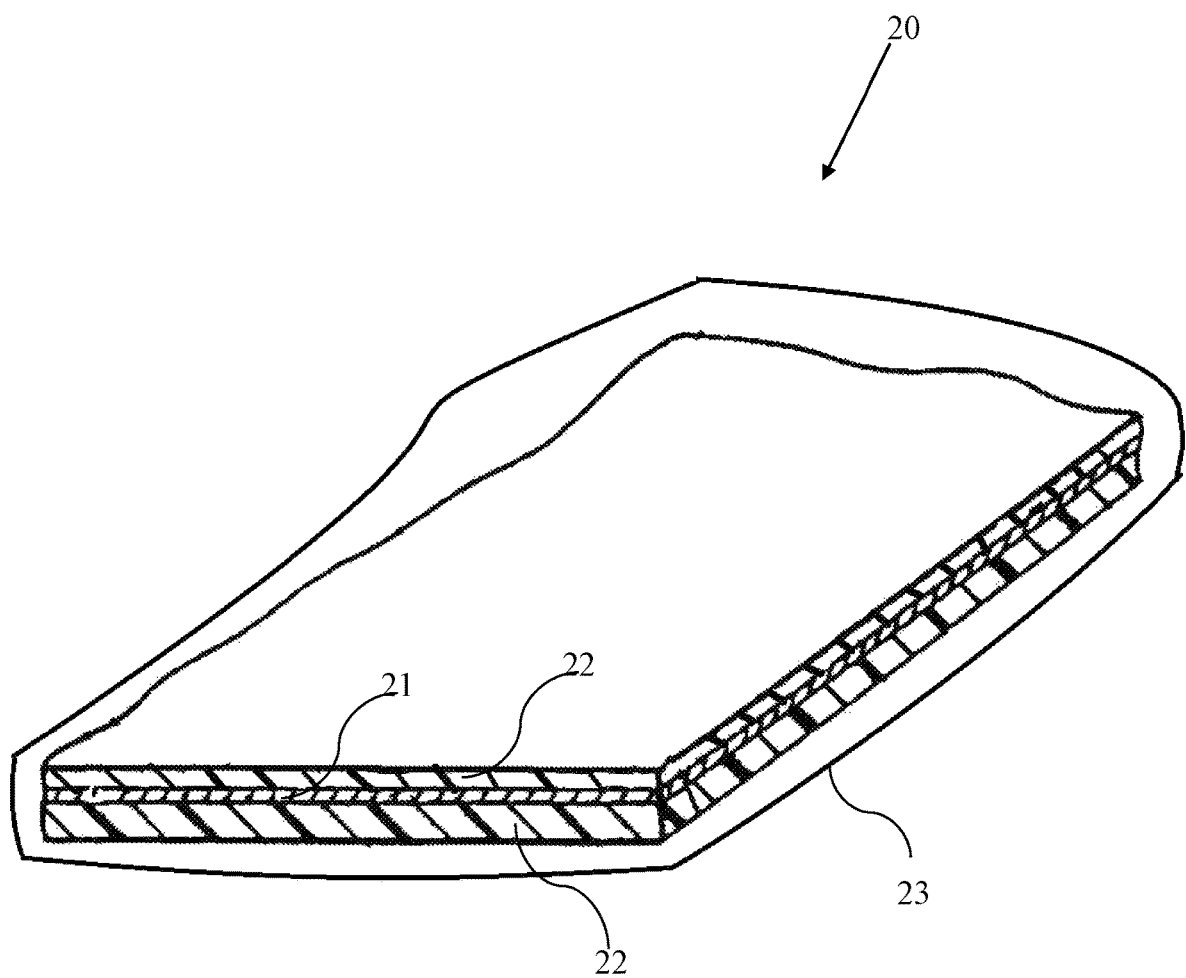
FIG. 2 is a schematic diagram of structure showing the ambient humidity control article in embodiment 2.

FIG. 2 is a schematic diagram of structure showing the ambient humidity control article in embodiment 2.

With respect to FIG. 2, the ambient humidity control article 20 in embodiment 2 comprises substrate 21, humidity control layer 22 coated on the substrate 21 and package bag 23 for use in holding the substrate 21.

Substrate 21 has a certain water absorbability, the water absorption amount of the substrate is not less than 0.5 grams per cubic centimeter. The material of the substrate is any one of paper type material, cotton, chemical fiber material, non-woven fabric, felt, porous plastics and mineral-based material. In the embodiment 2, cotton is selected as the substrate. The water absorption amount of the cotton is at least 0.5 grams per cubic centimeter, the water-retaining property amount of the cotton is at least 1.2 grams per cubic centimeter. For easy tailoring, the thickness of the cotton is 2 mm.

Humidity control layer 22 is made up of humidity control composition. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%. In the embodiment 2, the humidity control composition comprises KCl, NaCl and water, the weight percentage of the NaCl in the humidity control composition is 10.5%-24%, the weight percentage of the KCl in the humidity control composition is 3%-15.75%.

The purity of the NaCl and the KCl are all food grade purity (the purity is not less than 99.9%). The water is deionized water.

The amount of the humidity control composition coated on per cubic centimeter of the substrate is 0.54 grams.

The package bag 23 is used to hold the substrate coated with the humidity control composition. The package bag is made of thin-walled material that can permeate water vapor but not permeate liquid solution such as non-woven fabric, composite plastic, paper-plastic composite and cloth. Non-woven fabric is selected as the material of the package bag in the embodiment 2.

When the weight percentage of the NaCl and the KCl is greater than the percentage range, crystallization is easy to occur in the composition which requires high temperature to dissolve, resulting in high loss and making the weight of the composition being unstable. When the weight percentage of the NaCl and the KCl is lower than the percentage range, it takes much longer time to manufacture the ambient humidity control article and the humidity control capability will decrease.

Embodiment 3

In embodiment 3, the same instructions are omitted for the same structure as in embodiment 1.

Humidity control layer 12 is made up of humidity control composition. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%. In the embodiment 3, the humidity control composition comprises $NH_4Cl$, NaCl and water, the weight percentage of the NaCl in the humidity control composition is 10.5%-24%, the weight percentage of the $NH_4Cl$ in the humidity control composition is 7.5%-20.6%.

The purity of the NaCl is food grade purity (the purity is not less than 99.9%). The purity of the $NH_4Cl$ is not less than 99.9%. The water is deionized water.

The amount of the humidity control composition coated on per cubic centimeter of the substrate is 0.74 grams.

Embodiment 4

In embodiment 4, the same instructions are omitted for the same structure as in embodiment 1.

Humidity control layer 12 is made up of humidity control composition. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%. In the embodiment 4, the humidity control composition comprises KCl, NaCl and water, the weight percentage of the NaCl in the humidity control composition is 16.5%-22.5%, the weight percentage of the KCl in the humidity control composition is 3%-15.75%.

The purity of the NaCl and the KCl are all food grade purity (the purity is not less than 99.9%). The water is deionized water.

The amount of the humidity control composition coated on per cubic centimeter of the substrate is 0.54 grams.

Embodiment 5

In embodiment 5, the same instructions are omitted for the same structure as in embodiment 1.

Humidity control layer 12 is made up of humidity control composition. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%. In the embodiment 5, the humidity control composition comprises $NH_4Cl$, NaCl and water, the weight percentage of the NaCl in the humidity control composition is 16.5%-22.5%, the weight percentage of the $NH_4Cl$ in the humidity control composition is 12%-18%.

The purity of the NaCl is food grade purity (the purity is not less than 99.9%). The purity of the $NH_4Cl$ is not less than 99.9%. The water is deionized water.

The amount of the humidity control composition coated on per cubic centimeter of the substrate is 0.60 grams.

Embodiment 6

In embodiment 6, the same instructions are omitted for the same structure as in embodiment 1.

Humidity control layer 12 is made up of humidity control composition. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%. In the embodiment 6, the humidity control composition comprises KCl, NaCl and water, the weight percentage of the NaCl in the humidity control composition is 21%-22.6%, the weight percentage of the KCl in the humidity control composition is 4.5%-8.1%.

The purity of the NaCl and the KCl are all food grade purity (the purity is not less than 99.9%). The water is deionized water.

The amount of the humidity control composition coated on per cubic centimeter of the substrate is 0.70 grams.

Embodiment 7

In embodiment 7, the same instructions are omitted for the same structure as in embodiment 1.

Humidity control layer 12 is made up of humidity control composition. The humidity control composition comprises at least one of chloride salt and water, the chloride salt comprises at least one of NaCl, $NH_4Cl$, KCl and $MgCl_2$, the weight percentage of the chloride salt in the humidity control composition is 18%-44.6%. In the embodiment 7, the humidity control composition comprises $NH_4Cl$, NaCl and water, the weight percentage of the NaCl in the humidity control composition is 21%-22.6%, the weight percentage of the $NH_4Cl$ in the humidity control composition is 15%-17.1%.

The purity of the NaCl is food grade purity (the purity is not less than 99.9%). The purity of the $NH_4Cl$ is not less than 99.9%. The water is deionized water.

The amount of the humidity control composition coated on per cubic centimeter of the substrate is 0.64 grams.

The area of the 1 kilogram ambient humidity control article in embodiment 7 is 0.42 $m^2$ and the thickness is 0.3 cm. The ambient humidity control article is used to control the humidity of 1 cubic meters closed space (no external gas exchange), under the condition that the initial temperature is 25° C. and the range of the initial humidity is 10%-90%. The ambient humidity will be controlled within 65%-75% in 24 hours and the humidity control is long-term and effective. If the gas in the closed space is exchanged with the external gas with a humidity range of 40% for a long time, the effective time of humidity control is 1 month.

Take the embodiment 7 as an example, the amount of the humidity control composition in the ambient humidity control article for use in controlling different ambient humidity is a fixed value and there are all 0.64 grams humidity control composition coating on per cubic centimeter of substrate. However, the weight percentage of NaCl, $NH_4Cl$ and water in the humidity control composition is different, respectively

| Ambient humidity (%) | Nacl (%) | $NH_4Cl$ (%) | $H_2O$ (%) |
|---|---|---|---|
| 65 | 21 | 17.1 | 61.9 |
| 69 | 21 | 16.5 | 62.5 |
| 71 | 21.9 | 15 | 63.1 |
| 75 | 22.2 | 15 | 62.8 |

Embodiment 8

The humidity control composition for use in controlling ambient humidity within 65%-75% comprises KCl, $MgCl_2$ and water, the weight percentage of the KCl in the composition is 4.5%-22.5%, the weight percentage of the $MgCl_2$ in the composition is 9%-25.5%, the total weight percentage of the chloride salt in the composition is 18%-44.6%.

The purity of the KCl is food grade purity (the purity is not less than 99.9%). The $MgCl_2$ is anhydrous magnesium chloride and the purity of the $MgCl_2$ is not less than 99.9%. The water is deionized water.

The amount of the humidity control composition coated on per cubic centimeter of the substrate is 0.64 grams.

The Effect of the Embodiments

The ambient humidity control article according to the foregoing embodiments comprises: substrate, which have a certain water absorbability; humidity control layer, which is coated on the substrate. Wherein the amount of the humidity control composition coated on per cubic centimeter of the substrate is 0.64 grams. The humidity control composition comprises at least one of chloride salt and water, the chloride salt comprises at least one of NaCl, NH$_4$Cl, KCl and MgCl$_2$, the weight percentage of the chloride salt in the humidity control composition is 18%-44.6%, the water absorption amount of the substrate is not less than 0.5 grams per cubic centimeter. Therefore, the ambient humidity control article of the foregoing embodiments can control the ambient humidity within 65%-75%, does not need to pre-adjust the objective space, has large capacity of moisture absorption and desorption and can quickly achieve the desired humidity in the objective environment.

Moreover, since the ambient humidity control article of the foregoing embodiments comprises only chloride salt in common, the composition manufactured by using the chloride salt is not only cheap, but also safe for human body when manufacturing, environment and the objects to be preserved. In addition, the ambient humidity control article of the present invention is still friendly to the natural environment after being discarded, and can be decomposed naturally without causing secondary pollution.

The foregoing embodiments are preferred cases of the present invention and is not used to limit the scope of protection of the present invention.

The invention claimed is:

1. An ambient humidity control article to control an ambient humidity, comprising:
 a substrate, which has a predetermined water absorbability;
 a humidity control layer, which is coated on the substrate and comprising a humidity control composition;
 wherein an amount of the humidity control composition coated on per cubic centimeter of the substrate is 0.54-0.74 grams;
 the humidity control composition comprises NaCl, NH$_4$Cl and water;
 a weight percentage of the NaCl in the humidity control composition is 21%-22.6%;
 a weight percentage of the NH$_4$Cl in the humidity control composition is 15%-17.1%;
 a water absorption capacity of the substrate is not less than 0.5 grams per cubic centimeter; and
 wherein the ambient humidity is controlled within 65%-75%.

2. The ambient humidity control article of claim 1, wherein the substrate comprises one of the following materials: a cotton-wood pulp paper, cotton, chemical fiber material, non-woven fabric, felt, porous plastic and mineral-based material.

3. The ambient humidity control article of claim 1, further comprising a package bag, the package bag being configured to hold the substrate coated with the humidity control composition.

4. The ambient humidity control article of claim 3, wherein the package bag comprises one of the following materials: a non-woven fabric, composite plastic, paper-plastic composite and cloth.

5. The ambient humidity control article of claim 1, wherein the ambient humidity is controlled to 65%; the weight percentage of the NaCl in the humidity control composition is 21%; and the weight percentage of the NH$_4$Cl in the humidity control composition is 17.1%.

6. The ambient humidity control article of claim 1, wherein the ambient humidity is controlled to 69%; the weight percentage of the NaCl in the humidity control composition is 21%; and the weight percentage of the NH$_4$Cl in the humidity control composition is 16.5%.

7. The ambient humidity control article of claim 1, wherein the ambient humidity is controlled to 71%; the weight percentage of the NaCl in the humidity control composition is 21.9%; and the weight percentage of the NH$_4$Cl in the humidity control composition is 15%.

8. The ambient humidity control article of claim 1, wherein the ambient humidity is controlled to 75%; the weight percentage of the NaCl in the humidity control composition is 22.2%; and the weight percentage of the NH$_4$Cl in the humidity control composition is 15%.

* * * * *